United States Patent [19]

Verhulst et al.

[11] Patent Number: 5,467,105

[45] Date of Patent: Nov. 14, 1995

[54] DISPLAY DEVICE

[75] Inventors: Antonius G. H. Verhulst; Jacob Bruinink, both of Eindhoven, Netherlands

[73] Assignee: U.S. Philips Corporation, New York, N.Y.

[21] Appl. No.: 581,839

[22] Filed: Sep. 12, 1990

[30] Foreign Application Priority Data

Sep. 29, 1989 [NL] Netherlands ............................ 8902421

[51] Int. Cl.$^6$ .................................................... G09G 3/36
[52] U.S. Cl. ................................. 345/87; 359/54; 345/205
[58] Field of Search ...................................... 350/333, 332; 340/784, 719, 805; 359/54, 55, 60, 62; 345/87, 90, 84, 55, 205; 348/790

[56] References Cited

U.S. PATENT DOCUMENTS

| | | | |
|---|---|---|---|
| 4,227,201 | 10/1980 | Grinberg et al. | 350/332 |
| 4,413,883 | 11/1983 | Baratt | 359/62 |
| 4,709,992 | 12/1987 | Ueno | 359/60 |
| 4,728,175 | 3/1988 | Baron | 350/333 |
| 4,731,610 | 3/1988 | Baron et al. | 340/784 |
| 4,955,697 | 9/1991 | Tsukada et al. | 340/784 |

FOREIGN PATENT DOCUMENTS

| | | |
|---|---|---|
| 0299546 | 1/1989 | European Pat. Off. . |
| 2418022 | 11/1974 | Germany . |

*Primary Examiner*—Tommy P. Chin
*Assistant Examiner*—Doon Chow
*Attorney, Agent, or Firm*—Bernard Franzblau

[57] ABSTRACT

The time it takes for a liquid crystal display device picture to become homogeneous can be reduced to an acceptable extent by a suitable choice of the resistance and the capacitance of the orienting layers with respect to those of the liquid crystal layer. Possible DC voltages, which may occur in the case of a reset drive mode, can thus be rapidly eliminated.

41 Claims, 3 Drawing Sheets

DISPLAY DEVICE

BACKGROUND OF THE INVENTION

This invention relates to a display device comprising an electro-optical display medium, for example, a liquid crystalline display medium positioned between two supporting plates, a system of pixels arranged in rows and columns with each pixel being constituted by picture electrodes, insulating layers provided on the facing surfaces of the supporting plates, and a system of row and column electrodes for presenting selection and data signals by means of which a range of voltages dependent on the liquid crystalline display medium can be presented across the pixels for the purpose of picture display, said device also comprising means for applying an auxiliary voltage across the pixels prior to selection beyond or on the edge of the voltage range to be used for picture display.

The insulating layers may comprise a plurality of sub-layers, with the outer sub-layer functioning as an orienting layer for the liquid crystal molecules.

A display device of this type is suitable for displaying alpha-numerical information and video information.

Such a display device is described in U.S. Pat. No. 5,032,631 (Jul. 16, 1991). In that device asymmetrical non-linear switching elements are used to apply the voltages across the pixels. In U.S. patent application Ser. No. 414,565 filed Sep. 29, 1989, a display device is described in which symmetrical non-linear switching elements are used. Due to a spread in the properties of the switching elements, voltage variations occur which result in inhomogeneities in the picture information. However, these voltage variations were equalized. As a possible explanation of the equalization of voltage variations in the switching elements, said Application states that a DC voltage is gradually produced across the insulating/orienting layer covering the picture electrodes. However, dependent on the switching element associated with a pixel, this may require a considerable period of time (up to tens of seconds or more). During this period the total picture is not homogeneous.

OBJECT AND SUMMARY OF THE INVENTION

It is one of the objects of the invention to provide a display device of the type described in which the inhomogeneities in the picture due to a spread of the properties of the switching elements are equalized within an acceptable period of time (for example, 10 to 20 seconds).

To this end a display device according to the invention is characterized in that, viewed across a pixel, the electrical resistance $R_s$ of the insulating layers at the area of a pixel is large with respect to that of the layer of liquid crystalline material $R_l$, while the ratio $C_s/C_l$ between the capacitance $C_s$ (per surface unit) of the orienting layers at the area of the pixel and the capacitance $C_l$ (per surface unit) of the layer of liquid crystalline material at the area of the pixel has a value of between 1 and 100.

The resistance $R_s$ and the capacitance $C_s$ of the insulating layers is herein understood to mean the resistance and capacitance, respectively, of the two insulating layers, considered as a combined layer, measured in a direction perpendicular to the layers.

The invention is based inter alia on the recognition that the electrical equivalent of a display device can be represented by a series arrangement of a parallel RC network which is substantially defined by the properties of the insulating layers and a parallel RC network which is substantially defined by the properties of the liquid crystal material.

It is further based on the recognition that the desired fast equalization can be achieved by choosing the resistances and the capacitances of both the orienting (insulating) layers and of the liquid crystal material (and particularly their proportions) within given limits.

The inhomogeneities in the picture are found to disappear because the DC voltage across the liquid crystal material decreases in accordance with a voltage variation which in practice can approximately be represented by means of a characteristic time constant $\tau_{DC}$ for which it holds that:

$$\tau_{DC} = (C_s + C_l) \cdot \frac{R_s \cdot R_l}{R_s + R_l'} \approx \frac{R_s \cdot R_l}{R_s + R_l}$$

in which $C_s$: capacitance (per surface unit) of the combined insulating layers, $C_l$: capacitance (per surface unit) of the liquid crystal material, $R_s$: resistance (per surface unit) of the combined insulating layers, $R_l$: resistance (per surface unit) of the liquid crystal material. Since the condition holds that the DC voltage across the liquid crystal material must be minimal, $R_s$ is chosen to be larger than $R_l$ (for example, a factor of 10 larger). The limits of $C_s/C_l$ are determined by the maximum admissible loss of drive voltage on the one hand ($C_s/C_l>1$) and the influence of the capacitance $C_s$ on the time constant $\tau_{DC}$ on the other hand ($C_s/C_l<100$).

The ratio $C_s/C_l$ is preferably between 2 and 50.

Although the dielectric constants of the insulating layers and the liquid crystal, as well as the thickness of the liquid crystal layer play a role in the definition of $C_s$, a value $C_s$ is generally found in the range chosen for $C_s/C_l$ such that the overall combined thickness of the insulating layers is at least 0.3 μm. One or two layers may then be composed, if necessary, of sub-layers, with one of the sub-layers comprising, for example, a color filter.

A preferred embodiment of a device according to the invention is characterized in that auxiliary capacitances are arranged parallel to the pixels.

Such auxiliary capacitances do not influence the above-mentioned time constant $\tau_{DC}$ but prevent a possible rapid discharge of a pixel which may occur, for example, due to a given choice of the resistances and capacitances of the insulating layers and the liquid crystal layer. Possible influences of switching the liquid crystal material on for example, variations of the properties, may also be obviated to a certain extent.

As already stated, the device comprises means for applying an auxiliary voltage. This auxiliary voltage is preferably beyond or on the edge of the range of transition in the transmission/voltage characteristic of the liquid crystalline medium.

A first preferred embodiment of such a display device is characterized in that the picture electrode on one of the supporting plates is connected in an electrically conducting manner to the common point of two non-linear switching elements arranged in series between a column electrode for data signals and an electrode for a reference voltage.

The non-linear switching elements are, for example, diodes as described in said U.S. Pat. No. 5,032,831 which is hereby incorporated by reference.

A further preferred embodiment is characterized in that at least one of the picture electrodes is connected to a row or column electrode via a non-linear switching element and a row of pixels is selected during at least a part of a line period via the row electrodes and data signals are presented via the column electrodes, while the switching element is at least substantially symmetrical and, prior to presenting a data signal, the pixels are charged or discharged by means of the switching elements to an auxiliary voltage beyond or on the edge of the voltage range to be used for picture display.

Such a device is described in greater detail in the U.S. patent application Ser. No. 414,565, which is hereby incorporated by reference. The symmetrical switching elements may comprise, for example, a metal-isolator-metal element, a back-to-back diode element, a nin or pip-switching element or a plurality of sub-elements, as in the case of a diode ring or when using redundancy.

The pixels may also be capacitively coupled to the row electrodes or the column electrodes.

BRIEF DESCRIPTION OF THE DRAWINGS

These and other aspects of the invention will now be described in greater detail by way of example with reference to the accompanying drawings, in which.

DESCRIPTION OF THE PREFERRED EMBODIMENTS

Figure 1:
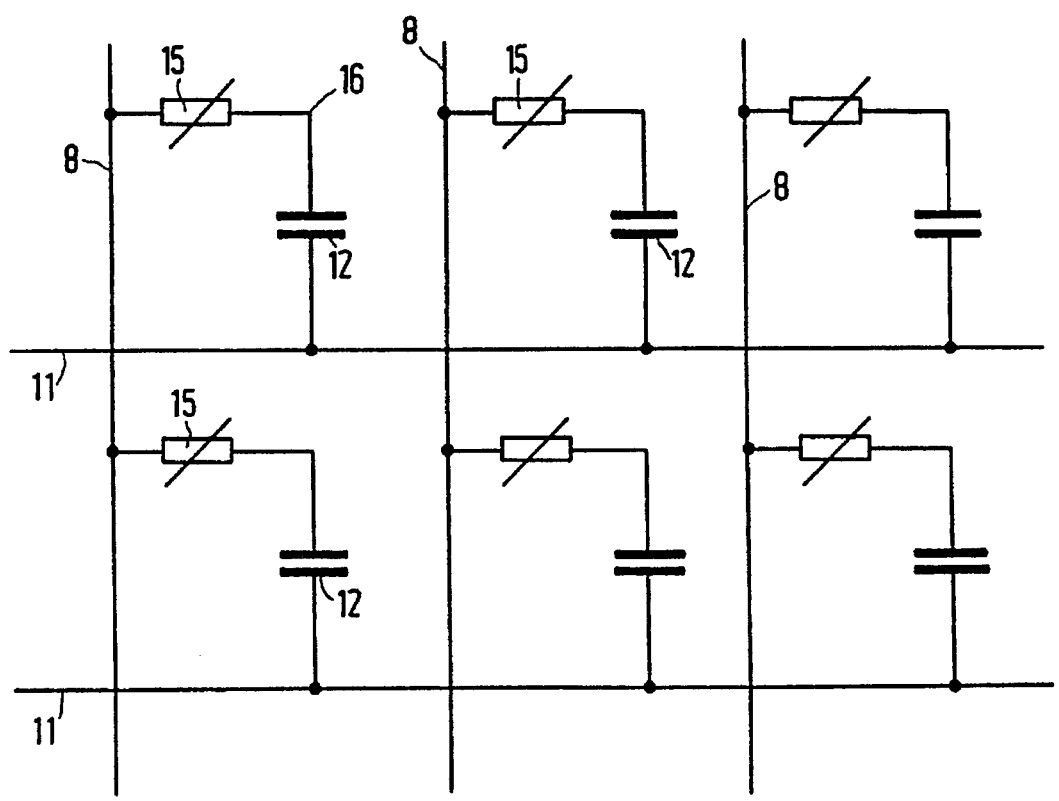
FIG. 1 shows diagrammatically a picture display device according to the invention.

FIG. 1 shows diagrammatically a display device according to the invention. Certain of the structural details of the picture display device can be fabricated in the manner shown in FIG. 1 of U.S. Pat. No. 5,032,831. Further details are shown in other figures of the drawing of the U.S. patent. Pixels 12, arranged in a matrix, are located at the area of crossings of row electrodes 11 and column electrodes 8, and are connected to the column electrodes 8 via non-linear switching elements 15, which are MIMs in this embodiment.

Figure 2:
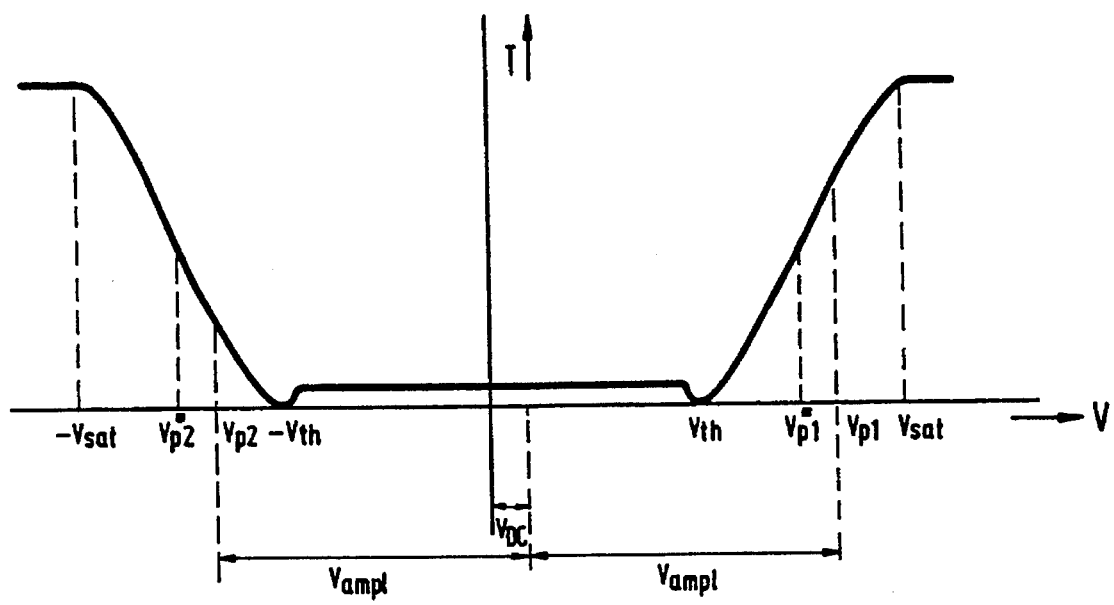
FIG. 2 shows graphically the transmission/voltage characteristic of an electro-optical medium, for example, a liquid crystal.

FIG. 2 shows graphically the transmission-voltage characteristic of the device of FIG. 1, including the transition ranges from $V_{th}$ to $V_{sat}$ to $-V_{th}$ to $-V_{sat}$.

If a data voltage Vd is presented to a column electrode 8, while a selection voltage Vs1 is presented to a selected row electrode 11, it holds for a selected pixel 12 that the voltage across this pixel, i.e. the pixel voltage Vp1 (see FIG. 2) is equal to:

$$Vp1 = Vd - Vs1 - Vm \quad (1)$$

in which Vm is the forward voltage of the MIM at which it supplies sufficient current to charge the pixel to the correct voltage within the desired time.

In a subsequent frame the data voltage is presented in an inverted form (−Vd), while the selection voltage is now Vs2.

Since the capacitance associated with the pixel 12 is first negatively charged too far in a manner analogous to that described in U.S. Pat. No. 5,032,831, it is now charged again while the current through the MIM has the same current direction so that the pixel voltage Vp2 (see FIG. 2) is now equal to:

$$Vp2 = -Vd - Vs2 - Vm \quad (2)$$

It follows from (1) and (2) that:

$$Vp1 - Vp2 = 2Vd - Vs1 + Vs2 \equiv 2\ Vampl \quad (3)$$

$$Vp1 + Vp2 = -Vs1 - Vs2 - 2Vm \equiv 2\ V_{DC} \quad (4)$$

Figure 3:
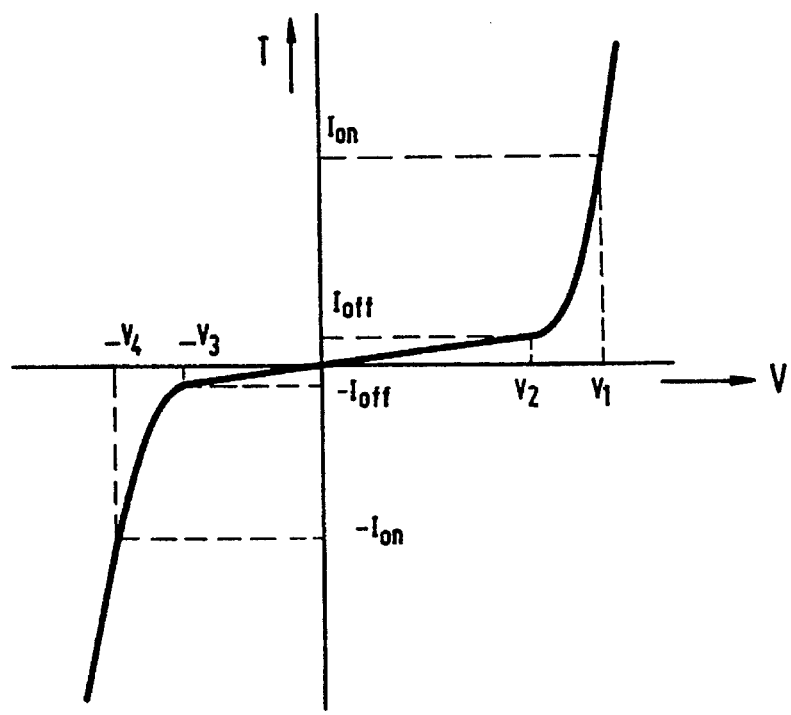
FIG. 3 shows graphically the current-voltage characteristic of a substantially symmetrical non-linear switching element (for example, a MIM)

In the ideal case (no spread of the voltage Vm, substantially symmetrical transmission/voltage characteristics as shown, for example, in FIG. 3) the pixel voltage at an equal but opposite data voltage Vd or −Vd is also equal but of opposite sign, provided that it holds for the selection voltages Vs1, Vs2 that Vs2=−Vs1−2Vm. It then holds that Vp1=−Vp2=Vampl. Simultaneously, $V_{DC}$=0.

Said pixel voltages Vp1, Vp2 can also be written as:

$$Vp1 = \tfrac{1}{2}(Vp1+Vp2) + \tfrac{1}{2}(Vp1-Vp2) = V_{DC} + Vampl \quad (5)$$

$$Vp2 = \tfrac{1}{2}(Vp1+Vp2) - \tfrac{1}{2}(Vp1-Vp2) = V_{DC} - Vampl \quad (6)$$

It appears that the DC voltage component $V_{DC}$, which is introduced due to the fact that the MIM voltage Vm (or that of another substantially symmetrical switching element) is not identical throughout the surface area of the picture display device, so that the voltage drop across an arbitrary MIM deviates from the nominal value Vm. The DC voltage component can be compensated in practice by an ion movement in the liquid crystal material so that after some time a DC voltage is only present across the insulating layer covering the electrodes. The effective pixel voltage V*p is now determined by the (periodically alternating) voltage Vampl. For this it holds that:

$$V^{*}p1 = -V^{*}p2 = Vampl \quad (\text{See FIG. 2}).$$

The voltage Vampl is substantially independent of the voltage drop across the MIM and possible variations therein. Variations due to a non-uniform switching behavior of the switching elements are therefore not found or are hardly found in the transmission behavior of the device because possible DC components are compensated. These DC components are independent of the data voltages (see (4)) so that no smear effects (image retention, ghost pictures) occur.

For reading information, a first selection voltage Vs1 is presented during a selection period $t_s$ to a selection line 11 while the information or data voltages $V_d$ are simultaneously presented to the column electrodes 8. This leads to, for example, a positive voltage across a pixel 12 which represents the presented information.

To prevent degradation of the liquid crystal and to be able to increase the so-called large-area flicker frequency, information of an alternating sign is preferably presented across the pixel 12. A negative voltage across the pixel 12, which represents the presented information, may be reached by presenting a second selection voltage Vs2 and simultaneously presenting inverted data voltages (−Vd) after having discharged the capacitance associated with the pixel 12 too far (or negatively charged too far) via the MIM 15.

As is apparent from formulas (5) and (6), the sign of the pixel voltage $V_p$ changes, for example, once per frame period, dependent on the magnitude of a possible DC component $V_{DC}$.

It has already been stated that inhomogeneities caused by spreads in the properties of the switching elements are equalized by means of a time variation which is characterized by a constant $\tau_{DC}$, whereafter the DC component $V_{DC}$ is substantially completely present across the orienting layers which cover the picture electrodes.

Figure 4:
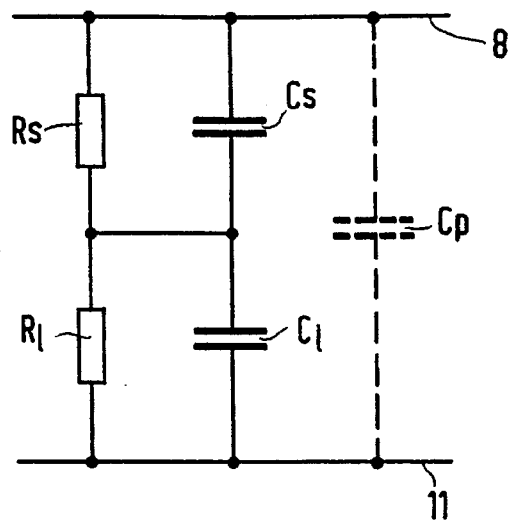
FIG. 4 shows diagrammatically a picture cell in the form of two RC elements.

This behavior in time can be described as the voltage variation in time across two RC circuits as shown in FIG. 4, by means of the formula:

$$\tau_{DC} = (C_s + C_l) \frac{R_s \cdot R_l}{R_s + R_l} \quad (7)$$

provided that $R_lC_l \gg 1$ frame period, $R_lC_l = \tau_{LC}$
in which $C_s$: capacitance (per surface unit) of the combined insulating layers, $C_l$: capacitance (per surface unit) of the liquid crystal material, $R_s$: resistance (per surface unit) of the combined insulating layers, $R_l$: resistance (per surface unit) of the liquid crystal material.

The time constant $\tau_{DC}$ therefore determines the way the picture becomes homogeneous. To obtain a minimum DC component across the layer of liquid crystal material, it holds that $R_s \gg R_l$ (for example, a factor of 10 or more) so that (7) can be written as:

$$\tau_{DC} = (C_s + C_l)R_l = \left(\frac{C_s}{C_l} + 1\right) R_l \cdot C_l = \left(\frac{C_s}{C_l} + 1\right) \tau_{LC} \quad (8)$$

Figure 5:
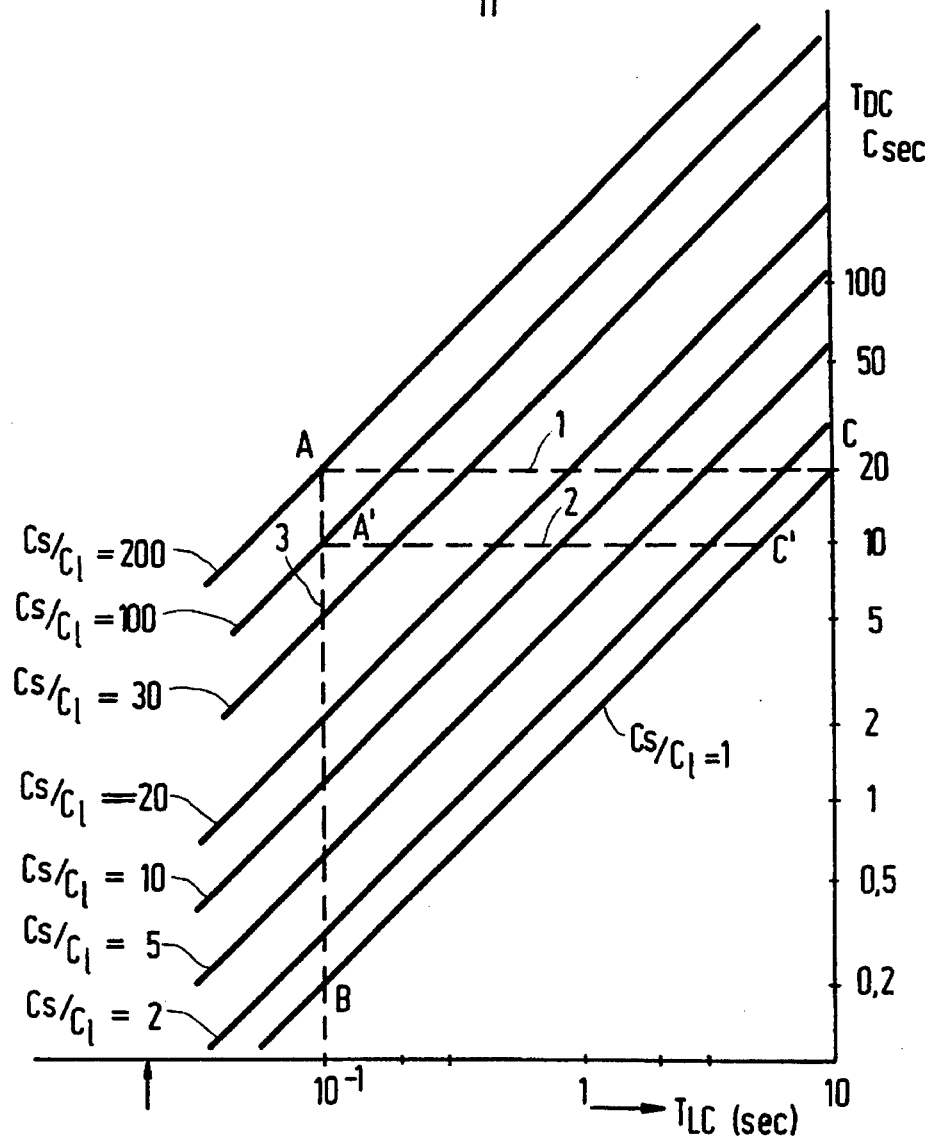
FIG. 5 shows the relation between $\tau_{DC}$ and $\tau_{LC}$ for different values of $C_s/C_l$.

The relation according to formula (8) is shown in FIG. 5 for different values of $C_s/C_l$(1–200). The behavior of a display device according to the invention can now be determined with reference to this Figure by means of a suitable choice of parameters.

For example, a region can be bounded on the one hand by imposing requirements on $\tau_{DC}$, for example, $\tau_{DC} < 20$ sec (broken line 1, FIG. 5) or $\tau_{DC} < 10$ sec (broken line 2, FIG. 5), and on the other hand, so as not to lose too much contrast, by imposing the requirement that $\tau_{LC} > 0.1$ sec (line 3, FIG. 5).

Within the triangles ABC and A'BC' fixed by these boundaries and the relation (8) for $C_s/C_l = 1$, a suitable combination of $\tau_{DC}$, $\tau_{LC}$ and $C_s/C_l$ can be chosen, while the choice of $C_s/C_l$ also depends on the drive voltage loss which can be tolerated (for example, $C_s/C_l = 4$ at 20% of drive voltage loss, $C_s/C_l = 9$ at 10% of drive voltage loss).

In the embodiment of a liquid crystal display device with a liquid layer having a thickness d=4 µm of the liquid ZL 84460 (Merck) it holds that $C_l = 7.74 \times 10^{-10}$ F/cm². At $\tau_{DC}$=10 sec and $C_s/C_l = 4$ it holds that $\tau_{LC} = 2$ sec (20° C.), while it holds for $C_s$ that $C_s = 7.1 \times 10^{-9}$ F/cm², which means for a single insulating layer (in the case of identical layers) that the capacitance per surface unit is $14.2 \times 10^{-9}$ F/cm². For a conventional polyimide $\Sigma_r \approx 4$ so that it holds that d≈0.25 µm for the thickness of the separate insulating layers. Such a thickness is so large that the layer can be composed of several sub-layers, for example, a first layer of titanium oxide/silicon oxide which is well-resistant to the pressure of spacers coated with an orienting layer of a more conventional thickness (0.05 µm). A color filter may also be realised in the first layer.

To prevent the adjustment of the total pixel from leaking away during a period of non-selection, a capacitance Cp (shown by means of broken lines in FIG. 4) can be realised parallel to the pixel. This is notably, but not exclusively advantageous at a smaller $\tau_{LC} = R_lC_l$. For leakage of the charge it appears that we must then take into account a time constant which is:

$$\tau_{cel} = R_l \left( C_l + \frac{C_p \cdot C_s}{C_p + C_s} \right), R_sC_s \gg R_lC_l \quad (9)$$

while equation (8) remains valid for the homogenization of the picture.

Since $\tau_{LC}$ may now be chosen to be smaller or may deliberately be reduced by adding, for example, ionogenic impurities to the liquid, there is a wider range of choices in FIG. 5.

In the above-mentioned example, $C_s/C_l$ was 4, in other words, $\tau_{DC} = 5\tau_{LC}$. When using a parallel capacitance Cp=4 $C_l$, it holds that:

$$\tau_{cel} = R_l \left( C_l + \frac{4C_l \cdot 4C_l}{4C_l + 4C_l} \right) = 3 \cdot \tau_{LC}$$

in other words, $\tau_{LC}$ may be ⅓ of the original value (2 sec at 20° C.) without loss of contrast due to leakage. At such a value of $\tau_{LC}$ (≈0.67 sec at 20° C.), $\tau_{DC} \approx 3.35$ sec so that homogenization occurs very rapidly.

In another example, we have, for example $C_s/C_l = 25$. With (8) (no parallel capacitance) this results in $\tau_{DC} = 26 \cdot \tau_{LC}$.

If we choose $\tau_{LC}$ (20° C.)=2 sec again, $\tau_{DC} = 52$ sec, which is comparatively long. Introduction of a parallel capacitance Cp=4.$C_l$ leads to (9):

$$\tau_{cel} = R_l \left( C_l + \frac{4C_l \cdot 25C_l}{4C_l + 25C_l} \right) = 4{,}45 \, \tau_{LC}$$

so that $\tau_{LC}$ can now be decreased by a factor of 4.45 without any loss of contrast. With $\tau_{LC}$ (20° C.)=2/4,45=0.45 sec the following time constant holds for the homogenization of the picture:

$$\tau_{DC} (20° C.) = 26 \times 0.45 \approx 12 \text{ sec}$$

which is very acceptable.

It is apparent from the foregoing that a suitable choice of $C_s$, $C_l$, $R_s$ and $R_l$, possibly together with a parallel capacitance $C_p$, makes it possible to compose the display device according to the invention in such a way that the picture is rapidly homogenized when using the above-mentioned drive modes.

We claim:

1. A display device comprising: an electro-optical display medium between two supporting plates, a system of pixels arranged in rows and columns, with each pixel being constituted by picture electrodes, insulating layers provided on the facing surfaces of the supporting plates, and a system of row and column electrodes for presenting selection and data signals across the pixels via switching elements by means of which a range of voltages dependent on the electro-optical display medium can be presented for the purpose of picture display, and means for applying an auxiliary voltage across the pixels via said switching elements prior to selection wherein the auxiliary voltage is beyond or on the edge of the voltage range to be used for picture display, characterized in that, viewed across a pixel, the electrical resistance ($R_s$) of the combined insulating layers at the area of a pixel is large with respect to that of the layer of electro-optical material $R_l$, wherein the ratio $C_s/C_l$ lies between 1 and 100 where $C_s$ is the capacitance of the combined insulating layers at the area of the pixel and $C_l$ is the capacitance of the layer of electro-optical material at the area of the pixel, and $\tau_{1c}=R_l C_l$ and lies in the range between 0.1 and 10 seconds.

2. A display device as claimed in claim 1, characterized in that the electrical resistance of the combined insulating layers $R_s$ at the area of a pixel is at least 10 times that of the electro-optical material $R_l$.

3. A display device as claimed in claim 2, characterized in that the sum of the thicknesses of the insulating layers is at least 0.3 μm.

4. A display device as claimed in claim 2, characterized in that at least one of the insulating layers comprises at least two sub-layers.

5. A display device as claimed in claim 2, characterized in that respective ones of a plurality of auxiliary capacitances are coupled parallel to individual ones of the pixels.

6. A display device as claimed in claim 2, characterized in that the auxiliary voltage is beyond or on the edge of the range of transition in the transmission/voltage characteristic of the electro-optical medium.

7. A display device as claimed in claim 2, characterized in that the picture electrode on one of the supporting plates is electrically connected to a common point of two non-linear switching elements connected in series between a column electrode for data signals and an electrode for a reference voltage.

8. A display device as claimed in claim 2, characterized in that at least one of the picture electrodes is connected to a row or column electrode via a non-linear switching element and a row of pixels is selected during at least a part of a line period via the row electrodes and data signals are presented via the column electrodes, while the switching element is at least substantially symmetrical and, prior to presenting a data signal, the pixels are charged or discharged to the auxiliary voltage by means of the switching elements.

9. A display device as claimed in claim 1, characterized in that $2<C_s/C_l<50$.

10. A display device as claimed in claim 9, characterized in that the sum of the thicknesses of the insulating layers is at least 0.3 μm.

11. A display device as claimed in claim 9, characterized in that at least one of the insulating layers comprises at least two sub-layers.

12. A display device as claimed in claim 9, characterized in that respective ones of a plurality of auxiliary capacitances are coupled parallel to individual ones of the pixels.

13. A display device as claimed in claim 9, characterized in that the auxiliary voltage is beyond or on the edge of the range of transition in the transmission/voltage characteristic of the electro-optical medium.

14. A display device as claimed in claim 9, characterized in that the picture electrode on one of the supporting plates is electrically connected to a common point of two non-linear switching elements connected in series between a column electrode for data signals and an electrode for a reference voltage.

15. A display device as claimed in claim 9, characterized in that at least one of the picture electrodes is connected to a row or column electrode via a non-linear switching element and a row of pixels is selected during at least a part of a line period via the row electrodes and data signals are presented via the column electrodes, while the switching element is at least substantially symmetrical and, prior to presenting a data signal, the pixels are charged or discharged to the auxiliary voltage by means of the switching elements.

16. A display device as claimed in claim 1, characterized in that the sum of the thicknesses of the insulating layers is at least 0.3 μm.

17. A display device as claimed in claim 1, characterized in that at least one of the insulating layers comprises at least two sub-layers.

18. A display device as claimed in claim 17, characterized in that one of the sub-layers comprises a color filter.

19. A display device as claimed in claim 17, characterized in that respective ones of a plurality of auxiliary capacitances are coupled parallel to individual ones of the pixels.

20. A display device as claimed in claim 17, characterized in that the auxiliary voltage is beyond or on the edge of the range of transition in the transmission/voltage characteristic of the electro-optical medium.

21. A display device as claimed in claim 17, characterized in that the picture electrode on one of the supporting plates is electrically connected to a common point of two non-linear switching elements connected in series between a column electrode for data signals and an electrode for a reference voltage.

22. A display device as claimed in claim 1, characterized in that respective auxiliary capacitances are coupled parallel to the pixels.

23. A display device as claimed in claim 22, characterized in that the auxiliary voltage is beyond or on the edge of the range of transition in the transmission/voltage characteristic of the electro-optical medium.

24. A display device as claimed in claim 22, characterized in that the picture electrode on one of the supporting plates is electrically connected to a common point of two non-linear switching elements connected in series between a column electrode for data signals and an electrode for a reference voltage.

25. A display device as claimed in claim 22, characterized in that at least one of the picture electrodes is connected to a row or column electrode via a non-linear switching element and a row of pixels is selected during at least a part of a line period via the row electrodes and data signals are presented via the column electrodes, while the switching element is at least substantially symmetrical and, prior to presenting a data signal, the pixels are charged or discharged to the auxiliary voltage by means of the switching elements.

26. A display device as claimed in claim 22 wherein $R_s C_s \gg R_l C_l$.

27. A display device as claimed in claim 1, characterized in that the auxiliary voltage is beyond or on the edge of the range of transition in the transmission/voltage characteristic of the electro-optical medium.

28. A display device as claimed in claim 1, characterized in that the picture electrode on one of the supporting plates is electrically connected to a common point of two non-linear switching elements connected in series between a column electrode for data signals and a common electrode for a reference voltage.

29. A display device as claimed in claim 28, characterized in that the common electrode is located between the picture electrodes and in a row of picture electrodes each pair of juxtaposed picture electrodes are connected via a respective non-linear switching element to the common electrode.

30. A display device as claimed in claim 29, characterized in that the non-linear switching elements comprise switching sub-elements.

31. A display device as claimed in claim 28, characterized in that the non-linear switching elements are diodes.

32. A display device as claimed in claim 31, characterized in that the non-linear switching elements comprise switching sub-elements.

33. A display device as claimed in claim 28, characterized in that the non-linear switching elements comprise switching sub-elements.

34. A display device as claimed in claim 1, characterized in that at least one of the picture electrodes is connected to a row or column electrode via non-linear switching element and a row of pixels is selected during at least a part of a line period via the row electrodes and data signals are presented via the column electrodes, while the switching element is at least substantially symmetrical and, prior to presenting a data signal, the pixels are charged or discharged to the auxiliary voltage by means of the switching elements.

35. A display device as claimed in claim 34, characterized in that the at least substantially symmetrical non-linear switching element is a metal-isolator-metal element, a back-to-back-diode element, a nin-switching element or a pip-switching element.

36. A display device as claimed in claim 34, characterized in that the at least substantially symmetrical non-linear switching element comprises at least one diode ring.

37. A display device as claimed in claim 1 wherein for a value of $C_s/C_l=100$, $\tau_{LC}=0.1$ seconds.

38. A display device comprising:
- a layer of an electro-optical display medium positioned between two supporting plates, said layer of electro-optical material having an electrical resistance $R_l$ and a capacitance $C_l$,
- a system of picture electrodes on the supporting plates which form a system of pixels arranged in rows and columns,
- first and second insulation layers provided on facing surfaces of the supporting plates,
- a system of row and column electrodes for supplying selection and data signals by means of which a range of voltages dependent on the electro-optical display medium can be applied across the pixels for the purpose of picture display,
- a plurality of auxiliary electrodes for applying an auxiliary voltage across the pixels prior to selection, wherein the auxiliary voltage is beyond or on the edge of the voltage range to be used for picture display, and
- a plurality of non-linear switching elements coupling respective ones of the picture electrodes to respective ones of the auxiliary electrodes, wherein said switching elements exhibit a spread in their properties which produce voltage variations that degrade the picture display, and
- wherein the voltage variations are equalized by providing the combined first and second insulation layers at the area of a pixel with an electrical resistance $R_s$ and a capacitance $C_s$, wherein the ratio of $C_s/C_l$ is in the range between 1 and 100 and $\tau_{LC}=R_l C_l$ lies in the range between 0.1 and 10 seconds.

39. A display device as claimed in claim 38 wherein the electrical resistance $R_s$ is at least ten times the electrical resistance $R_l$ at the area of a pixel.

40. A display device as claimed in claim 39 further comprising a plurality of auxiliary capacitances, wherein respective ones of the auxiliary capacitances are coupled in parallel with respective ones of the pixels.

41. A display device as claimed in claim 39 wherein a time constant $\tau_{DC}$ is at most 20 seconds, where $\tau_{DC} \approx (C_s + C_l) R_l$.

* * * * *